США010616624B2

(12) United States Patent
Heusser

(10) Patent No.: US 10,616,624 B2
(45) Date of Patent: Apr. 7, 2020

(54) MULTI-ANGLE VIDEO SYNCHRONIZATION AND MULTI-ANGLE VIDEO INTERFACE

(71) Applicant: Rhinobird Inc., Cambridge, MA (US)

(72) Inventor: Felipe Heusser, Belmont, MA (US)

(73) Assignee: Rhinobird Inc., Cambridge, MA (US)

( * ) Notice: Subject to any disclaimer, the term of this patent is extended or adjusted under 35 U.S.C. 154(b) by 0 days.

(21) Appl. No.: 15/909,370

(22) Filed: Mar. 1, 2018

(65) Prior Publication Data

US 2018/0255332 A1 Sep. 6, 2018

Related U.S. Application Data

(60) Provisional application No. 62/465,543, filed on Mar. 1, 2017.

(51) Int. Cl.

| | | |
|---|---|---|
| *H04N 21/242* | (2011.01) | |
| *H04N 21/218* | (2011.01) | |
| *H04N 21/6587* | (2011.01) | |
| *H04N 21/2187* | (2011.01) | |
| *H04N 21/235* | (2011.01) | |
| *H04H 60/73* | (2008.01) | |
| *H04N 21/472* | (2011.01) | |
| *H04N 21/2365* | (2011.01) | |
| *H04H 20/18* | (2008.01) | |
| *H04N 21/43* | (2011.01) | |
| *H04N 21/8547* | (2011.01) | |

(52) U.S. Cl.
CPC .......... *H04N 21/242* (2013.01); *H04H 20/18* (2013.01); *H04H 60/73* (2013.01); *H04N 21/2187* (2013.01); *H04N 21/21805* (2013.01); *H04N 21/2353* (2013.01); *H04N 21/2365* (2013.01); *H04N 21/4307* (2013.01); *H04N 21/47217* (2013.01); *H04N 21/6587* (2013.01); *H04N 21/8547* (2013.01)

(58) Field of Classification Search
CPC ............................ H04N 21/242; H04H 20/18
See application file for complete search history.

(56) References Cited

U.S. PATENT DOCUMENTS

| | | | | |
|---|---|---|---|---|
| 9,159,364 | B1 * | 10/2015 | Matias | ................ G11B 27/034 |
| 9,582,157 | B1 * | 2/2017 | Chatterjee | .......... G06F 17/30781 |
| 2017/0272830 | A1 * | 9/2017 | Richman | ............ H04N 21/4858 |
| 2018/0227586 | A1 * | 8/2018 | Choi | ...................... H04N 19/31 |

* cited by examiner

*Primary Examiner* — Thai Q Tran
*Assistant Examiner* — Girumsew Wendmagegn
(74) *Attorney, Agent, or Firm* — Morrison & Foerster LLP

(57) ABSTRACT

This disclosure relates to a multi-angle video platform operating on web and mobile, that allows users to play many videos at the same time about the same experience. Combining real time video technology, metadata analysis, and machine learning, the techniques, systems, and methods disclosed herein can facilitate easily syncing multiple videos of events like music festivals, rallies, sports, or music, giving users the chance to not only watch but also participate in the video experience, switching across video angles or audio sources, or eventually adding their own video or audio inputs into the multi-angle experience. The systems and methods disclosed herein can facilitate syncing live and/or non-live videos, as well as videos contributed directly to a mobile or computer-hosted application, as well as videos posted on external API's. Multi-angle videos, live or non-live, can be played in a mobile or computer-hosted application or on a website.

26 Claims, 8 Drawing Sheets

MULTI-ANGLE VIDEO SYNCHRONIZATION AND MULTI-ANGLE VIDEO INTERFACE

CROSS-REFERENCE TO RELATED APPLICATION

This application claims the benefit of U.S. Provisional Application No. 62/465,543, filed on Mar. 1, 2017, which is hereby incorporated by reference in its entirety for all purposes.

FIELD

This application relates generally to video and audio data processing, and more specifically to the synchronization of multiple sources of video data and audio data.

BACKGROUND

Today, 65% of internet bandwidth is video, and this figure is expected to increase. One force driving the growth of internet video is consumer-generated content, such as videos recorded and uploaded or streamed by individual users of web and social-media platforms, as opposed to professional or corporate entities creating highly-produced video content. According to the head of Google Research, by 2020, 90% of the internet bandwidth will be video.

However, the great majority of videos saved in a cloud or on a server are never discovered by more than a vanishingly small number of people (or by anyone other than the original creator) and never produce any economic value. Current techniques for searching, discovering, and classifying video content on the internet does not facilitate efficient or effective discovery of video content that is of interest to users. Furthermore, current techniques for searching, discovering, classifying, displaying, and consuming video content do not facilitate meaningfully linking related video content such that it can be consumed by a user in a cohesive video platform; rather, users are forced to perform crude and cumbersome keyword searches and to watch numerous individual videos one-at-a-time in order to attempt to determine whether any video content of interest to the user exists.

SUMMARY

As described above, an increasingly large amount of internet bandwidth is attributable to video content, and a large amount of video content is recorded and created by individual users and never discovered, shared, or monetized by any more than a very small number of people. Accordingly, there is a need for systems, methods, and techniques for discovering and curating large amounts of video data, including live video and non-live video, and including video that is recorded or otherwise created by individual users as opposed to professional or corporate entities. There is a need for tools for discovery and curation of video data to be available not just for everyday users that want to watch a specific experience, but for entities in the social media industry. Furthermore, there is a need for tools for discovering and curating video data that include dynamic and interactive elements, rather than merely a passive viewing experience.

Disclosed herein are techniques and systems for video curation and consumption that include synced multi-angle video (MAV). In some embodiments, conventional video discovery techniques may be improved by replacing video-search variables like 'publication date', 'author', 'references' and 'object-image recognition' with new variables that are more appropriate to video discovery, like: 'the time when the video started recording', 'the location at which the video was recorded', or 'audio tracks recognized in the video'. Such variables may improve video discovery because people searching for videos may not always be seeking a single video unit. For example, someone searching for video content may be seeking video data associated with a particular experience, such as a concert, performance, wedding, sporting event, speech, rally, demonstration, conflict, or other public or private event. Discovering video data relating to a specific experience may be more effective, fast, accurate, and efficient when systems account for the place and/or time when videos were captured, similar audio patterns recognizable across songs, lectures, news, or other events, or similar visual patterns (e.g., closed captions, shapes, or images, etc.) across various videos.

Further disclosed herein are systems and methods for video consumption that overcome constraints of linear video viewing (one video at a time), including by allowing users to watch many videos at the same time, synchronized, and in a single window. In some embodiments, a user may be able to pick the best angle, the best audio source, or other individualized attributes from among all videos synced into the experience. Furthermore, users can contribute video data associated with an experience by uploading video from their own perspective, thereby adding their own angle to the experience. The user's uploaded video data may then be synchronized and reproduced with the other angles associated with the same experience.

In some embodiments a first system for processing video content for synchronized playback is provided, the system comprising one or more processors and memory storing one or more programs executable by the one or more processors, the one or more programs including instructions for: receiving first video data and associated first metadata from a device in communication with the system; comparing the first metadata to second metadata associated with second video data; in accordance with a determination that the first metadata and the second metadata satisfy matching criteria, associating the first video data and the second video data with one another; calculating a time offset data of the first video data using first time metadata included in the first metadata; and storing the first video data along with associated synchronization metadata, wherein the synchronization metadata is configured to enable the first video data to be simultaneously played back in synchronization with the second video data, and where in the synchronization metadata is based at least in part on the time offset data.

In some embodiments of the first system, comparing the first metadata to the second metadata comprises comparing the first time metadata with second time metadata included in the second metadata; and the determination that the first metadata and the second metadata satisfy matching criteria comprises a determination that the first video data and second video data depict an overlapping period of time.

In some embodiments of the first system, comparing the first metadata to the second metadata comprises comparing first location metadata included in the first metadata with second location metadata included in the second metadata; and the determination that the first metadata and the second metadata satisfy matching criteria comprises a determination that the first video was recorded within a predetermined distance of the second video.

In some embodiments of the first system, the synchronization metadata is based at least in part on comparing first audio signatures of the first video data with second audio signatures of the second video data.

In some embodiments, a first non-transitory computer-readable storage medium for processing video content for synchronized playback is provided, the non-transitory computer-readable storage medium storing one or more programs executable by one or more processors, the one or more programs including instructions for: receiving first video data and associated first metadata from a device in communication with the one or more processors; comparing the first metadata to second metadata associated with second video data; in accordance with a determination that the first metadata and the second metadata satisfy matching criteria, associating the first video data and the second video data with one another; calculating a time offset data of the first video data using first time metadata included in the first metadata; and storing the first video data along with associated synchronization metadata, wherein the synchronization metadata is configured to enable the first video data to be simultaneously played back in synchronization with the second video data, and where in the synchronization metadata is based at least in part on the time offset data.

In some embodiments of the first non-transitory computer-readable storage medium, comparing the first metadata to the second metadata comprises comparing the first time metadata with second time metadata included in the second metadata; and the determination that the first metadata and the second metadata satisfy matching criteria comprises a determination that the first video data and second video data depict an overlapping period of time.

In some embodiments of the first non-transitory computer-readable storage medium, comparing the first metadata to the second metadata comprises comparing first location metadata included in the first metadata with second location metadata included in the second metadata; and the determination that the first metadata and the second metadata satisfy matching criteria comprises a determination that the first video was recorded within a predetermined distance of the second video.

In some embodiments of the first non-transitory computer-readable storage medium, the synchronization metadata is based at least in part on comparing first audio signatures of the first video data with second audio signatures of the second video data.

In some embodiments, a first method for processing video content for synchronized playback is provided, the method comprising: receiving first video data and associated first metadata from a device; comparing the first metadata to second metadata associated with second video data; in accordance with a determination that the first metadata and the second metadata satisfy matching criteria, associating the first video data and the second video data with one another; calculating a time offset data of the first video data using first time metadata included in the first metadata; and storing the first video data along with associated synchronization metadata, wherein the synchronization metadata is configured to enable the first video data to be simultaneously played back in synchronization with the second video data, and where in the synchronization metadata is based at least in part on the time offset data.

In some embodiments of the first method, comparing the first metadata to the second metadata comprises comparing the first time metadata with second time metadata included in the second metadata; and the determination that the first metadata and the second metadata satisfy matching criteria comprises a determination that the first video data and second video data depict an overlapping period of time.

In some embodiments of the first method, comparing the first metadata to the second metadata comprises comparing first location metadata included in the first metadata with second location metadata included in the second metadata; and the determination that the first metadata and the second metadata satisfy matching criteria comprises a determination that the first video was recorded within a predetermined distance of the second video.

In some embodiments of the first method, the synchronization metadata is based at least in part on comparing first audio signatures of the first video data with second audio signatures of the second video data.

In some embodiments, a first device for providing synchronized video content is provided, the device comprising a display, one or more processors, and memory storing one or more programs executable by the one or more processors, the one or more programs including instructions for: receiving a request from a user to play first video data; and in response to receiving the first request from the user: playing the first video data; and simultaneously with playing the first video data, playing the second video data, wherein playback of the first video data is synchronized with playback of the second video data.

In some embodiments of the first device, the second video data is automatically selected for simultaneous playback alongside the first video data in accordance with a determination that one or more criteria of the first video data matches corresponding criteria of the second video data.

In some embodiments of the first device, the one or more criteria of the first video data comprise a time at which the first video data was recorded.

In some embodiments of the first device, the one or more criteria of the first video data comprise a location at which the first video data was recorded.

In some embodiments of the first device, playing the second video data simultaneously with playing the first video data comprises: playing the first video data in a primary window displayed on the display; playing the second video in an auxiliary window displayed on the display; receiving an input from the user indicating a selection of the second video; and in response to receiving the input from the user: ceasing to play the first video data in the primary window, and continuing playback of the first video data in the auxiliary window; and ceasing to play the second video data in the auxiliary window, and continuing playback of the second video data in the primary window.

In some embodiments of the first device, synchronizing the first video data with the second video data comprises playing the first video data and second video data such that a common event depicted in both the first video data and the second video data is played back at the same time.

In some embodiments of the first device, synchronizing the first video data with the second video data comprises playing the first video data and second video data such that a similar characteristic depicted in both the first video data and the second video data is played back at the same time.

In some embodiments, a second non-transitory computer-readable storage medium for providing synchronized video content is provided, the non-transitory computer-readable storage medium storing one or more programs executable by one or more processors, the one or more programs including instructions for: receiving a request from a user to play first video data; and in response to receiving the first request from the user: playing, via a display, the first video data; and simultaneously with playing the first video data, playing the second video data, wherein playback of the first video data is synchronized with playback of the second video data.

In some embodiments of the second non-transitory computer-readable storage medium, the second video data is automatically selected for simultaneous playback alongside the first video data in accordance with a determination that one or more criteria of the first video data matches corresponding criteria of the second video data.

In some embodiments of the second non-transitory computer-readable storage medium, the one or more criteria of the first video data comprise a time at which the first video data was recorded.

In some embodiments of the second non-transitory computer-readable storage medium, the one or more criteria of the first video data comprise a location at which the first video data was recorded.

In some embodiments of the second non-transitory computer-readable storage medium, playing the second video data simultaneously with playing the first video data comprises: playing the first video data in a primary window displayed on the display; playing the second video in an auxiliary window displayed on the display; receiving an input from the user indicating a selection of the second video; and in response to receiving the input from the user: ceasing to play the first video data in the primary window, and continuing playback of the first video data in the auxiliary window; and ceasing to play the second video data in the auxiliary window, and continuing playback of the second video data in the primary window.

In some embodiments of the second non-transitory computer-readable storage medium, synchronizing the first video data with the second video data comprises playing the first video data and second video data such that a common event depicted in both the first video data and the second video data is played back at the same time.

In some embodiments of the second non-transitory computer-readable storage medium, synchronizing the first video data with the second video data comprises playing the first video data and second video data such that a similar characteristic depicted in both the first video data and the second video data is played back at the same time.

In some embodiments, a second method for providing synchronized video content is provided, the method performed at a device having a display, one or more processors, and one or more processors, the method comprising: receiving a request from a user to play first video data; and in response to receiving the first request from the user: playing the first video data; and simultaneously with playing the first video data, playing the second video data, wherein playback of the first video data is synchronized with playback of the second video data.

In some embodiments of the second method, the second video data is automatically selected for simultaneous playback alongside the first video data in accordance with a determination that one or more criteria of the first video data matches corresponding criteria of the second video data.

In some embodiments of the second method, the one or more criteria of the first video data comprise a time at which the first video data was recorded.

In some embodiments of the second method, the one or more criteria of the first video data comprise a location at which the first video data was recorded.

In some embodiments of the second method, playing the second video data simultaneously with playing the first video data comprises: playing the first video data in a primary window displayed on the display; playing the second video in an auxiliary window displayed on the display; receiving an input from the user indicating a selection of the second video; and in response to receiving the input from the user: ceasing to play the first video data in the primary window, and continuing playback of the first video data in the auxiliary window; and ceasing to play the second video data in the auxiliary window, and continuing playback of the second video data in the primary window.

In some embodiments of the second method, synchronizing the first video data with the second video data comprises playing the first video data and second video data such that a common event depicted in both the first video data and the second video data is played back at the same time.

In some embodiments of the second method, synchronizing the first video data with the second video data comprises playing the first video data and second video data such that a similar characteristic depicted in both the first video data and the second video data is played back at the same time.

In some embodiments, a third device for providing synchronized video content is provided, the device includes a display, one or more processors, and memory storing one or more programs executable by the one or more processors, the one or more programs including instructions for: receiving a request from a user to play first video data; in response to receiving the first request from the user: playing the first video data in the display, and storing the first video data and a plurality of video data associated with the first video data in a virtual carousel configured to enable the user to select second video data of the plurality of video data for playing in the display, wherein the second video data is adjacent to the first video data in the virtual carousel.

In some embodiments of the third device, the virtual carousel is a first virtual carousel and the plurality of video data is a first plurality of video data, and in response to receiving the first request from the user, the one or more programs include instructions for: storing the first video data and a second plurality of video data associated with the first video data in a second virtual carousel configured to enable the user to select third video data of the second plurality of video data for playing in the display, wherein the third video data is adjacent to the first video data in the second virtual carousel.

In some embodiments of the third device, the plurality of video data are hidden and actively played in the background. In some embodiments, audio associated with the first video data is played and audio associated with the plurality of video data is muted.

In some embodiments of the third device, the one or more programs include instructions for: receiving an input from the user indicating a selection of the second video data; and in response to receiving the input from the user: sliding the first video data out of the display; and simultaneously with sliding the first video data, sliding the second video data onto the display.

In some embodiments of the third device, the input comprises a horizontal swipe or a vertical swipe on the display.

In some embodiments of the third device, the plurality of video data are automatically selected for storing in the virtual carousel in accordance with a determination that one or more criteria of the first video data matches corresponding criteria of each video data in the plurality of video data.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION

As described herein, multi-angle video (MAV) systems and methods may create a faster, more efficient, more accurate, and more intuitive video experience for users by allowing them to play one or more videos (including live and non-live videos) at the same time. MAV systems may allow one or more users to upload or otherwise provide videos that may be processed to be filtered/categorized so that they are associated with videos sharing one or more aspects in common, and further to be processed to be configured to be viewed in synchronization with associated videos. For example, a MAV system may enable a user to view multiple videos of a single sporting event, concert, speech, performance, song, ceremony, gathering, rally, conflict, meeting, or other event in synchronization with other videos of the same event.

In some embodiments, MAV systems may include a video player that allows a user to control a video experience by being able to switch across different angles (including synced or non-synced angles) and pick different audio sources. In some embodiments, the video player may provide a user interface that includes a primary window for viewing a first video and one or more auxiliary windows for concurrently viewing one or more videos related and synchronized to the first video. In some embodiments, the video player includes a user interface that provides related videos in a carousel, enabling users to easily switch between multiple videos. Herein, the term "angles" may be used to refer to different audio and/or video data corresponding to the same event or experience. The term "syncing," as used herein, may refer to one or more techniques for processing video data, potentially along with associated audio data and other metadata, in order to configure the data to be consumed through a MAV interface in synchronization along with video data from other sources.

Videos synced by MAV systems into a multi-angle experience may be sourced by users directly to a MAV system through an associated client application, or may be obtained from external API's such as the Youtube and Facebook API's (or any other suitable API associated with video content) in association with queries obtained by users through the client application. Some embodiments of syncing mechanisms for live and non-live video and multi-angle video players available for desktop and mobile clients (e.g., iOS, Android) are described in greater detail below.

Syncing Non-Live Videos

Figure 1A:
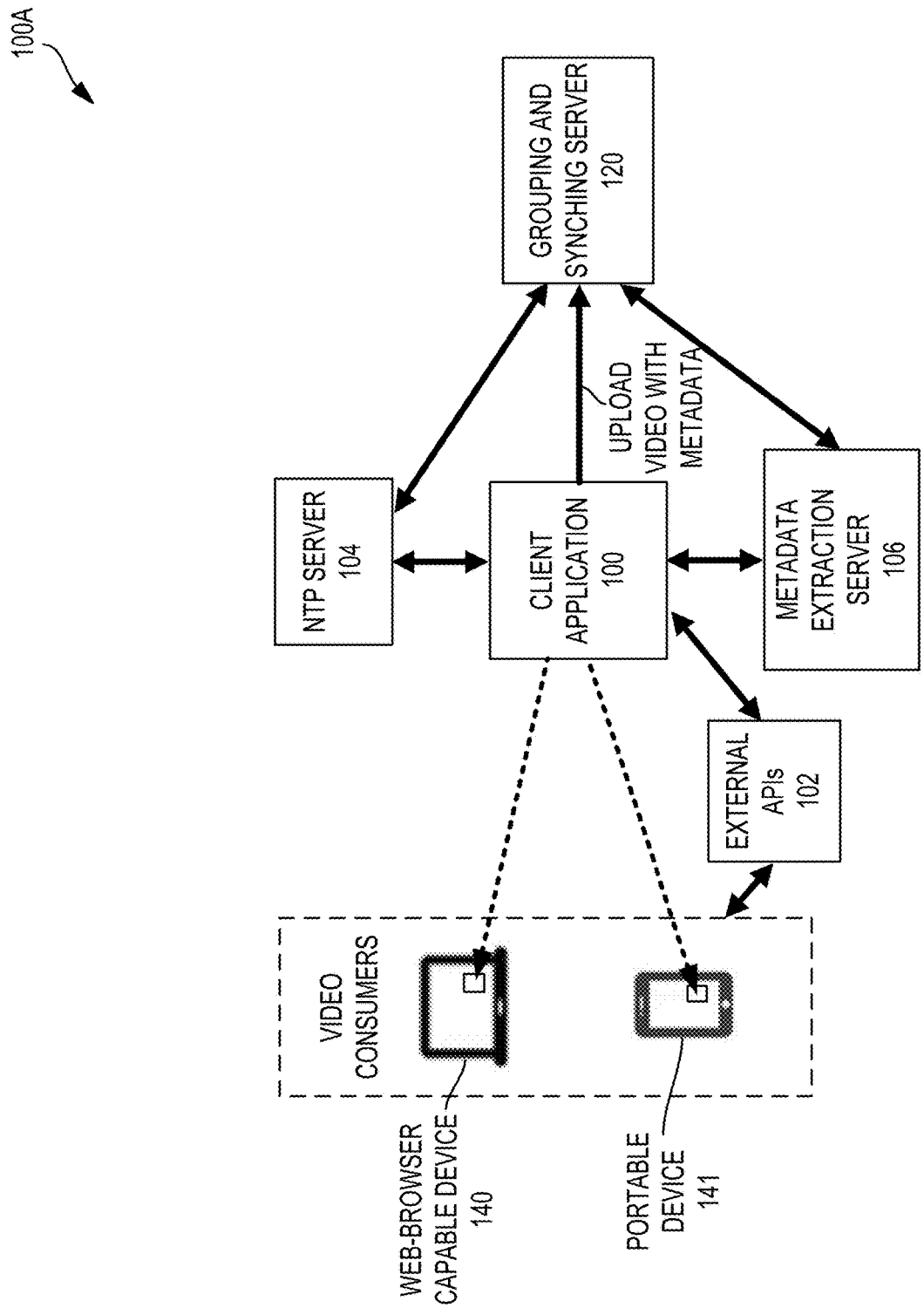
FIGS. 1A-B shows multi-angle video (MAV) systems for uploading and syncing videos in accordance with some embodiments.

FIG. 1A shows a multi-angle video (MAV) system 100A for uploading and syncing videos in accordance with some embodiments. As described herein, MAV system 100A may enable users to upload and sync videos such that the videos may be available for consumption as part of a MAV interface. Video data, which may include and/or accompany associated audio data and associated metadata, may be uploaded through system 100A, and the uploaded data may be processed in order to configure the video data to be viewed in a MAV interface in synchronization with other videos in the system or other videos provided from different sources.

In some embodiments, MAV system 100A may facilitate syncing both live videos as well as non-live videos. Live videos may refer to video data that is transmitted from one source to a computer network such as the internet and is consumed at a separate node or location connected to the computer network with substantially little latency or delay, such as less than 5 seconds, less than one second, or less than 0.5 seconds of latency or delay. Live videos may also refer to any video data that is streamed from one source to another, such that the video data is downloaded and consumed as it is actively being produced and uploaded. Non-live videos may refer to video data that is produced and/or uploaded before being consumed (e.g., more than 0.5 seconds, more than 1 second, or more than 5 seconds before being consumed), and it may refer to any video that is accessed, downloaded, or consumed after the video data is uploaded and/or stored in its entirety (as opposed to streaming the video directly from its source). Non-live videos may include, in some embodiments, archived videos that were previously live and time-stamped by a client application (e.g., client application 100) and videos recorded with mobile cameras and later uploaded through a client application, and/or videos hosted in other platforms via external APIs.

The MAV system 100A includes video consumers, who may be any party in communication with other elements of MAV system 100A and who receive video data from MAV system 100A. In some embodiments, video consumers may also be video providers (e.g., broadcasters or uploaders) who may transmit video data to MAV system 100A. Video consumers may include users of web-browser capable device 140, which may be any computer device capable of accessing the internet via a web browser, such as a desktop computer, laptop, tablet, etc. Video consumers may also include users of portable device 141, which may be a portable electronic device such as a tablet or a smart phone.

The MAV system 100A may further include client application 100, which may be an application stored on web-browser capable device 140 or portable device 141 (or on any other device associated with a video consumer) and configured to interface with other components of MAV system 100A. As shown by the dotted arrows in FIG. 1A, each of web-browser capable device 140 and portable device 141 may store and run an instance of client application 100. In some embodiments, client application 100 may be an executable program, a web-browser hosted interface, a mobile device application, or any other program or set of instructions stored on and/or executable by one or more processors of a device associated with a video consumer.

In some embodiments, client application 100 may enable a user of a device running client application 100 to upload video data and associated metadata to MAV system 100A. In some embodiments, the video data and the associated metadata can be uploaded in the form of a video file (e.g., a Matroska file, an MP4 file, an AVI file, a Flash Video (FLV) file, etc.). In some embodiments, the metadata can include: information about the video data (e.g., software employed to produce the video, video and/or audio formats, a date or timestamp of creation, GPS coordinates, etc.) that is automatically generated by a device that produced the video data; or information about the video data (e.g., a title, a description, tags, etc.) that is entered by a user. operational and automatically gathered video metadata.

In some embodiments, the metadata may be used to group the uploaded video with other videos that are determined to be part of the same experience (e.g., the same concert, show, performance, sports game, etc.), and may further be used to enable the video to be synchronized with other videos with which it is grouped, so that the videos may be simultaneously played back in synchronization with one another. In some embodiments, metadata associated with uploaded videos may include audio data, time data (e.g., a timestamp in the form of hashtag string data), text data (e.g., closed captions, subtitles, descriptions, etc.), location data (e.g., GPS coordinates), position data, user identity data, and/or image data. In some embodiments, time data may include an oldest timestamp associated with the video, which may indicate an absolute time at which recording of the video presumably began.

In some embodiments, when the video data is uploaded via client application 100, client application 100 may scan the user device (e.g., web-browser capable device 140 or portable device 141) in order to transmit other relevant metadata to MAV system 100A along with metadata stored with the video data.

MAV system 100A may further include external APIs 102, which may be in communication with one or both of client application 100 and video consumer devices, e.g., web-browser capable device 140 and portable device 141. External APIs may be any one or more API's associated with video content of any external and/or third-party platform, such as the Youtube API or the Facebook API. In some embodiments, external APIs 102 may be hosted on distinct servers in communication with one or more other elements of MAV system 100A, as shown in FIG. 1A.

MAV system 100A may further include network time protocol (NTP) server 104, which may be any server associated with one or more computer time protocols for synchronizing computer clocks, such as the Network Time Protocol. NTP server 104 may be configured to communicate with client application 100, as illustrated, and may alternately or additionally be configured to communicate with one or more other elements of MAV system 100A, as shown in FIG. 1A. In some embodiments, client application 100 may be configured to exchange information with NTP server 104 in order to determine whether there should be any offset time applied to time metadata associated with the video data in order for the time metadata to conform with the standard time as tracked by NTP server 104. By applying time offsets where necessary to ensure that all video data is associated with adjusted time metadata that conforms with the time standard of NTP server 104, it may be ensured that all grouped videos can be played back simultaneously and in accurate synchronization with one another.

In some embodiments, users accessing MAV system 100A may upload a video from their local files or video gallery using client application 100. After uploading a video file, client application 100 may read metadata stored in the video file and associated with the video being uploaded. In some embodiments, client application 100 may include one or more metadata readers for reading the metadata stored in various formats such as EXIF, QuickTime, XMP, etc. Based on the obtained metadata, client application 100 may then identify the oldest time data associated with the video file, and may compare this time versus the time of NTP server 104. If the time differs, an offset of time may be determined based on the difference, and the offset time may then be used to adjust the reported time identified from the metadata (e.g., exif time) of the uploaded file.

In some embodiments, determining the offset time may include accounting for time metadata associated with the video data, the identity of the device from which the video data originated, the operating system of the device from which the video data originated, the location of the device from which the video data originated, the position of the device from which the video data originated, and/or other metadata associated with the video data and/or the device from which the video data originated. By accounting for device identity and operating system identity for each video individually, accurate syncing of videos originating from different devices, operating systems, and platforms may be enabled.

The MAV system 100A may further include metadata extraction server 106, which may be any server in communication with client application 100 that is configured to analyze video data, audio data, image data, and/or associated metadata communicated to metadata extraction server 106 through client application 100 to group a video with other related videos. In some embodiments, metadata extraction server 106 receives the video data, audio data, and associated metadata within a video file transmitted by client application 100. In some embodiments, the metadata reader of client application 100 can be implemented on metadata extraction server 106 to extract metadata from the video file.

In some embodiments, metadata extraction server 106 may analyze the video data and associated metadata to recognize audio patterns, image patterns, or a combination thereof. In some embodiments, metadata extraction server 106 may analyze audio patterns, image patterns, video content, and/or associated metadata for a plurality of distinct videos sent from client application 100, in order to recognize one or more audio patterns, one or more video patterns, one or more pieces of metadata, or a combination thereof that is similar or the same across the group of distinct videos to group the plurality of related videos together with one another and in order to achieve accurate syncing of the plurality of videos in time. The information extracted and/or generated by metadata extraction server 106 may be stored in association with video data to which the information pertains, and the information may be sent to the client application 100 and/or to grouping and syncing server 120 (which may search for further matches with other videos and may sync the video with other matching videos).

Metadata extraction server 106 may be configured to communicate with client application 100 and/or with grouping and syncing server 120, as illustrated, and may also be configured to communicate with one or more other elements of MAV system 100A. In some embodiments, the functions discussed herein as being performed by metadata extraction server 106 may be performed by software and/or processors on devices of video consumers or video producers, or may alternately or additionally be performed by software and/or processors on third-party or external devices or servers (e.g., within grouping and syncing server 120).

The MAV system 100A may further include grouping and syncing server 120, which may be any server or any API on any one or more servers of MAV system 100A configured to facilitate receiving, storing, and analyzing of video data (including associated audio data, image data, and video content) and associated metadata from client application 100 and process the received video data and associated metadata to compare it to data associated with other videos stored in or accessible by MAV system 100A. In some embodiments, grouping and syncing server 120 may analyze received data (e.g., video data and associated metadata) associated with a first video to compare it with received and/or stored data associated with one or more other videos in order to group or otherwise associate two or more videos together into one or more groups that contain videos having common characteristics, such as videos having common time-based metadata, location-based metadata, or other metadata.

In some embodiments, as discussed above, grouping and synching server 120 can receive the video in the form of a video file including video data and associated metadata. Further, grouping and synching server 120 can communicate with metadata extraction server 106 to extract and/or analyze metadata associated with the video, according to some embodiments.

As discussed further elsewhere herein, grouping and syncing server 120 may analyze video data and associated metadata from a plurality of videos to associate two or more videos (of the plurality of videos) that are determined to be likely to correspond to the same experience (e.g., same concert, same sporting event, same performance, etc.) based on analysis of the video data and/or associated metadata.

In some embodiments, grouping and syncing server 120 may use time-based metadata, including accounting for any offset time calculated by client application 100 in conjunction with NTP server 104, in order to catalog, group, or otherwise associate the video along with other videos that share common time-based metadata. In some embodiments, cataloging, grouping, or otherwise associating videos with one another may also be done in accordance with other metadata, such as audio data, hashtag data, caption/description/text data, location data, position data, and/or image data. In some embodiments, videos may be grouped with one another in accordance with a determination that two or more videos have the same or similar (e.g., within a predetermined similarity threshold) metadata of any one or more type of metadata. In some embodiments, recording-time metadata may be considered one of the most important types of metadata in grouping video data into MAV video experiences, as it may be beneficial for videos recorded at the same time to be grouped together, as those videos may be more likely to correspond to recordings of the same event. However, in other instances, recording-time metadata may not be considered at all, such as when a video is a lip-sync video or a reaction video, as it may be beneficial to group together videos of lip-syncs to the same song or videos of reactions to the same video, and to synchronize those videos in accordance with the song or video that is the focus of the video, rather than to attempt to synchronize them in accordance with the absolute time of their recording.

Further, as discussed further elsewhere herein, grouping and syncing server 120 may configure grouped videos for synchronized consumption (e.g., playback), such that the time-based metadata, audio-based metadata, video data, image-based metadata, position-based metadata, location-based metadata, and/or other metadata are analyzed by the server in order to synchronize the videos such that they may be played back via a MAV interface in synchronization. In some embodiments, synchronization may indicate synchronization based on absolute time, such that synced videos of a concert or sporting event will play back to depict different angles of the same event occurring at the same time. It should be noted that in some embodiments, time metadata of a video may be unreliable, inaccurate, compromised, or absent, and synchronization of the video in accordance with recording time may therefore be more difficult. In these instances, a user or administrator of MAV system 100A may in some embodiments manually insert or alter time metadata in order to facilitate synchronization in accordance with the time metadata the user manually provides.

In some embodiments, synchronization may indicate synchronization based on a characteristic other than absolute time, such as the beginning of a song being played. For example, two lip-sync videos (or, similarly, reaction videos) associated with the same song may be synced such that the videos will play back so that the song is simultaneously played/performed in both videos, even if the videos were recorded at different points in time.

In some embodiments, synchronization of videos may be achieved by analyzing other metadata aside from time-stamp or other time-based metadata. For example, in the case of lip-sync or reaction videos discussed above, grouping and syncing server 120 may analyze audio signatures in the videos in order to determine how to synchronize them so that the song or video in the video overlap in synchronization. Alternately, if videos of the same live event (e.g., concert, performance, rally, etc.) are to be synchronized in accordance with absolute real-time, then the synchronization may also be performed in accordance with an analysis of audio signatures from the videos, with the aim of overlaying corresponding/matching audio signatures from each video in order to synchronize the videos. In some embodiments, image data and/or video data itself may alternately or additionally be used in a similar manner as discussed herein with respect to audio data in order to achieve or aid synchronization of two distinct videos.

In some embodiments, as discussed above, grouping and syncing server 120 can transmit the received video (e.g., video data and/or associated metadata) to metadata extraction server 106, which may perform the analysis of audio signatures. Subsequently, grouping and syncing server 120 may receive an audio signature of the video and compare the audio signature to those of other videos to group the video with the other videos, according to some embodiments.

In some embodiments, grouping and or syncing videos with one another may involve storing the video data in a predefined location and/or storing the video data in association with one or more pieces of metadata generated or retrieved by grouping and syncing server 120, such that the synced/grouped video data may be retrieved by client application 100, and application 100 may read the associated metadata in order to enable the video to be served to video consumers alongside and in synchronization with other associated grouped/synced videos.

In some embodiments, users of client application 100 may request access to videos posted in external platforms, such as videos posted to Youtube and Facebook, via the respective APIs of the external platforms (e.g., external APIs 102). Client application 100 may call the video requested by the user, and may scan the available metadata provided by the API (e.g., by extracting metadata via metadata extraction server 106 as described above). This metadata may then be processed by NTP server 104 and metadata extraction server 106 (e.g., as described above) may be configured to analyze time data, visual patterns data, audio data, or other video data and/or metadata. Once metadata such as time offset data is generated, stored, and/or associated with the video, then the video data and metadata may be sent to grouping and syncing server 120, which may find a sync match with one or more other videos that share one or more characteristics in common with the video (e.g., as described above).

Figure 1B:
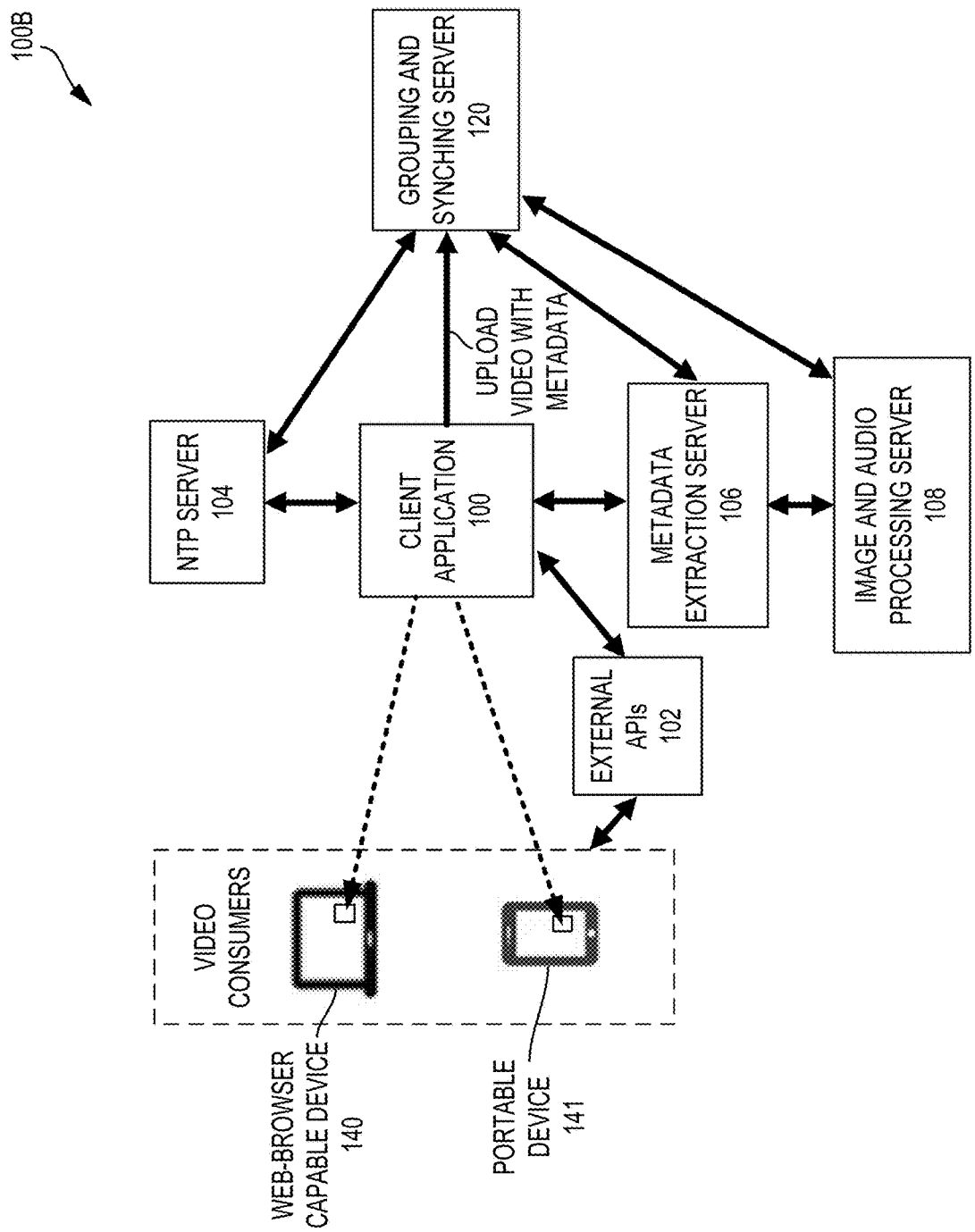

FIG. 1B shows a MAV system 100B for uploading and syncing videos in accordance with some embodiments. Further to MAV system 100A of FIG. 1A, MAV system 100B can include image and audio processing server 108 configured to perform computer vision and audio analysis of video data to extract additional metadata to be compared across a plurality of videos to group related videos together for synchronized play. In some embodiments, image and audio processing server 108 can be configured to analyze the video data (e.g., images or video frames) to recognize and extract images, shapes, closed captions, texts, or other visual patterns. Additionally, image and audio processing server 108 can be configured to analyze the video data (e.g., audio) to recognize and extract audio patterns.

In some embodiments, in contrast to metadata extraction server 106 that is configured to analyze metadata associated with and received with video data from client application 100, image and audio processing server 108 can be configured to extract metadata from the video data. In some embodiments, the functionality of image and audio processing server 108 can be implemented in metadata extraction server 106 or in grouping and synching server 120. As shown in MAV system 100B, image and audio processing server 108 can be configured to communicate results of its computer vision and audio analysis with one or more elements of MAV system 100B including metadata extraction server 106 or grouping and synching server 120.

Accordingly, in some embodiments, in addition to grouping and synchronizing related videos based on metadata (e.g., time, location, audio, etc.) analyzed by metadata extraction server 106, grouping and synching server 120 can also group related videos based on metadata (e.g., images, shapes, audio patterns, closed captions, etc.) that image and audio processing server 108 derived from video data.

Multi Multi-Angle Video Player Interface

In some embodiments, users of a MAV system (e.g., MAV system 100A-B of FIGS. 1A-B, respectively) may play multi-angle video (including synced and non-synced videos) via a multi-angle video player interface. The MAV player interface may be rendered in accordance with one or more sets of stored computer-executable instructions, such as instructions stored as part of client application 100 as described above with reference to FIGS. 1A-B. The MAV player interface may be caused to be displayed on one or more displays of a device associated with a MAV system, such as web-browser capable device 140 or portable device 141 as described with reference to FIGS. 1A-B. In some embodiments, the MAV player interface may be configured to enable display and interaction with synchronized video content, including by accepting inputs from a user in order to manipulate and control video, audio, and other content associated with the MAV player interface. In some embodiments, the MAV player interface may be configured to accept inputs in the form of mouse-based inputs, keyboard based inputs, and touch-based (e.g., touch-screen-based) inputs.

In some embodiments, the MAV player interface may be available to be accessed via web browsers for both desktop and mobile devices (including at a dedicated web address and as an object that may be embedded in any website), and it may also be available to be accessed via stored executable programs and/or mobile native applications that may, for example, include iOS and Android applications. The MAV player interface may reproduce one or more live or recorded videos, either in sync (e.g., synced in time, audio, and/or image) or not synced, as described below in further detail.

Figure 2A:
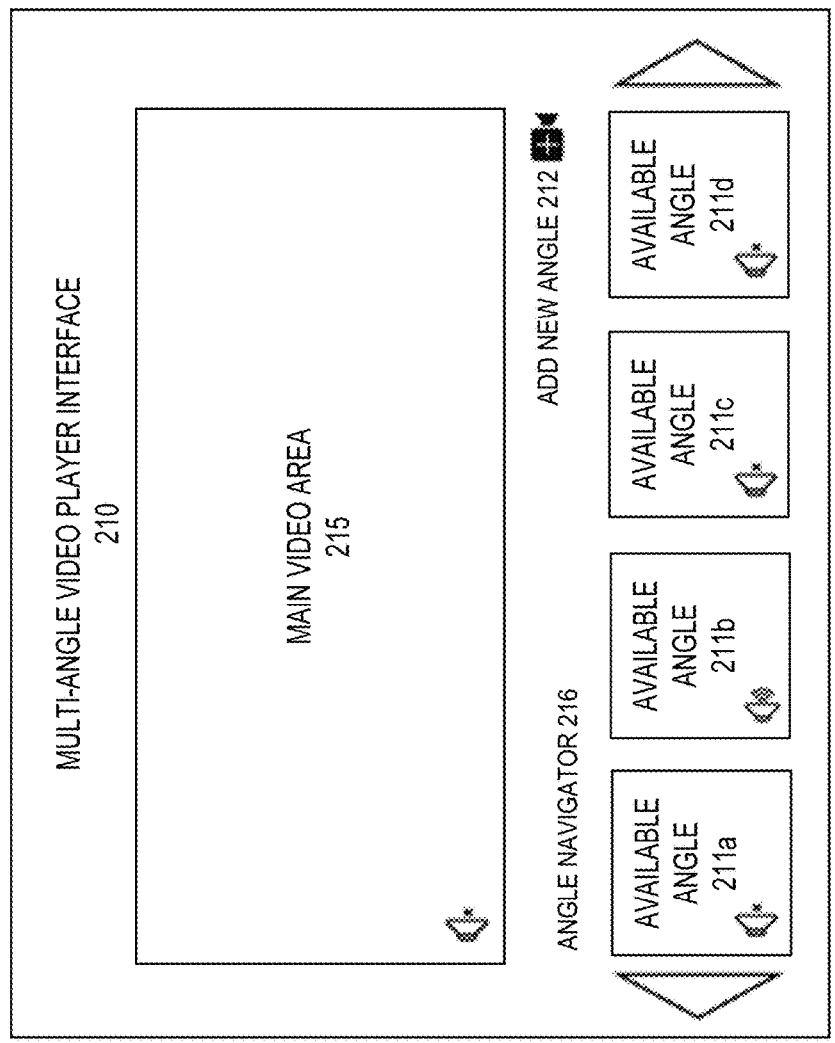
FIGS. 2A-C show MAV interfaces for viewing videos in accordance with some embodiments.
Figure 2B:
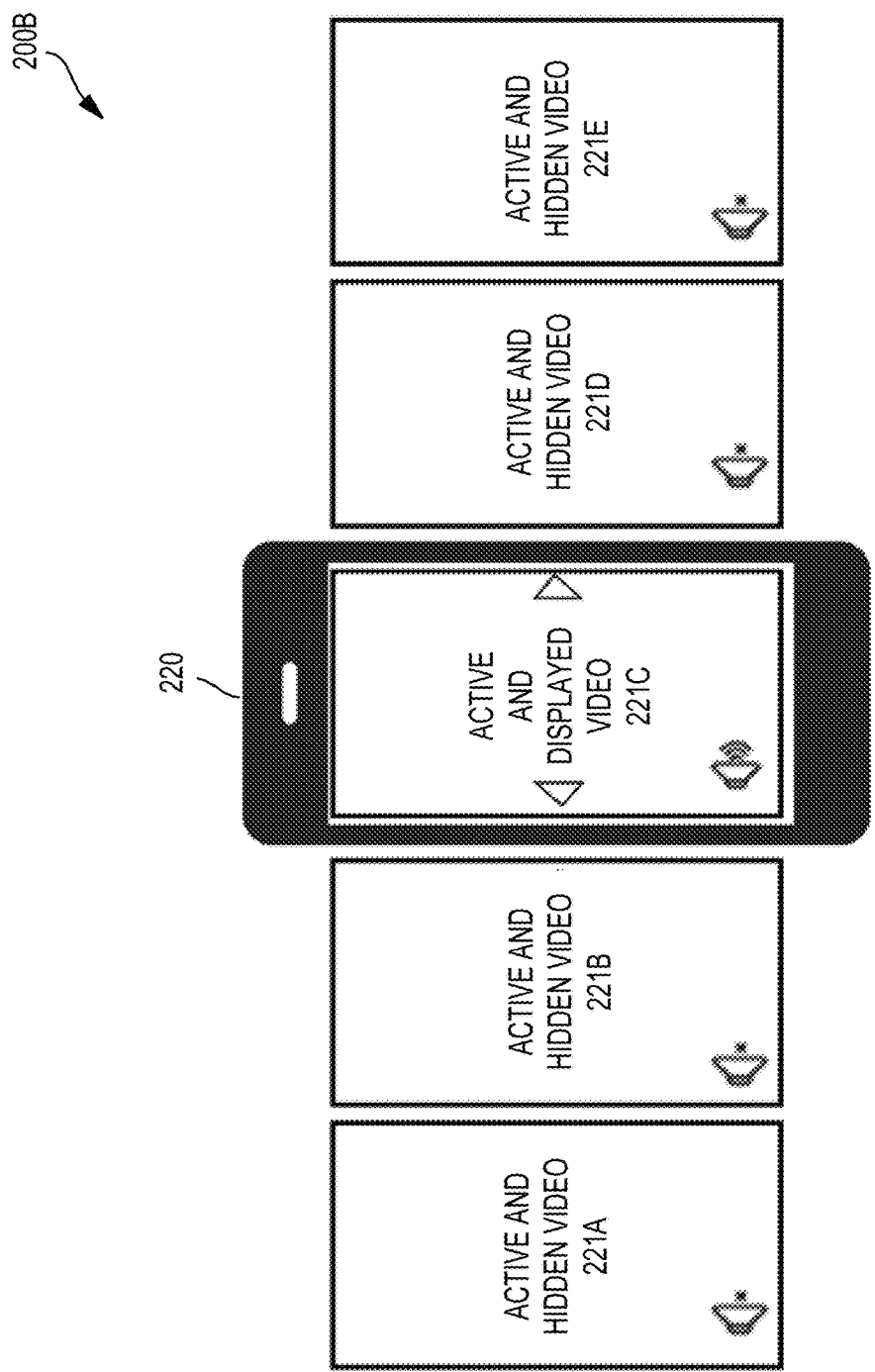
Figure 2C:
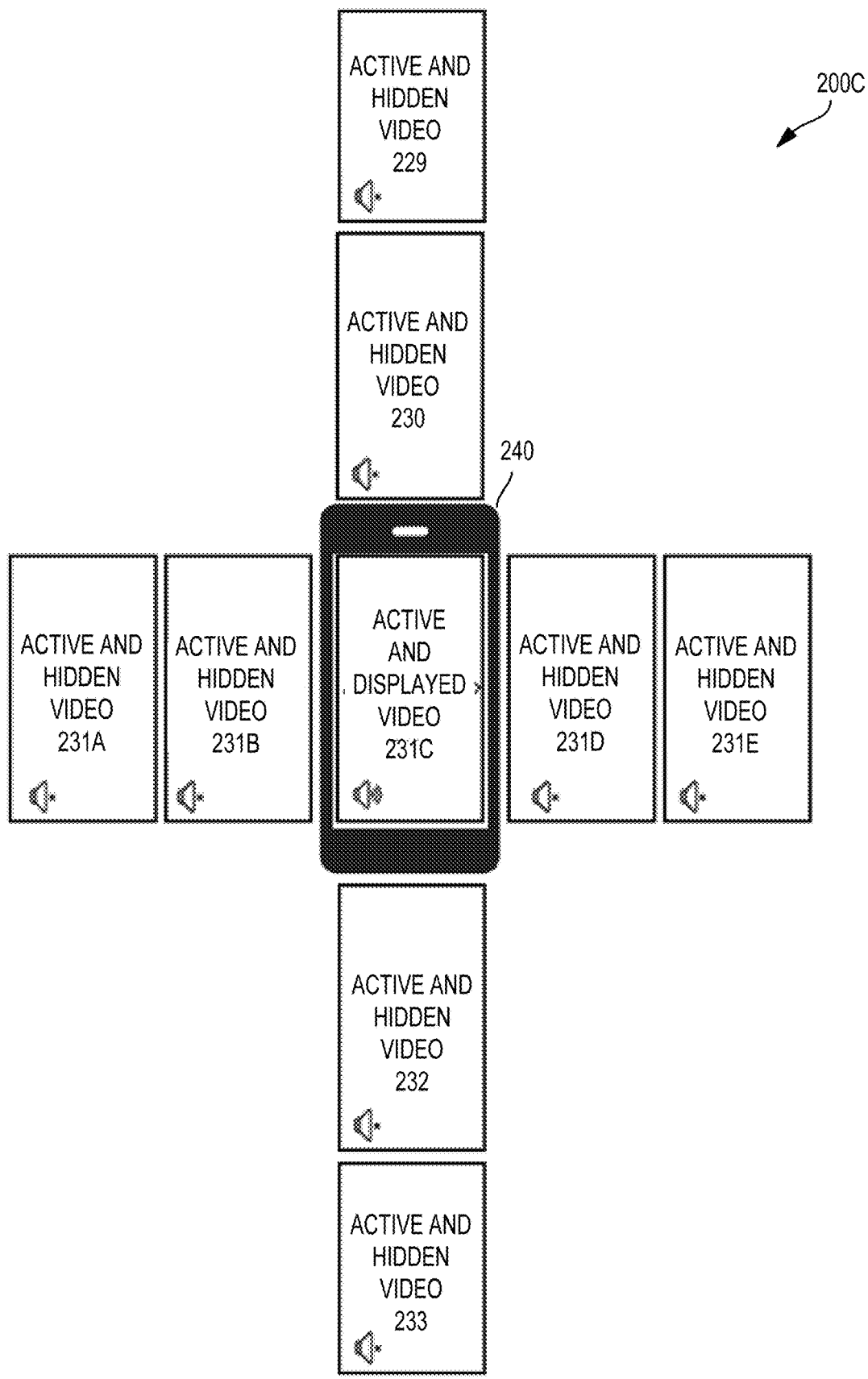

FIGS. 2A-C are diagrams 200A-C of MAV player interfaces, in accordance with some embodiments. One or more of the aspects of the interfaces of FIGS. 2A-C may be displayed, in some embodiments, on a display of a device associated with a MAV system and configured to receive and play back synchronized video content from the MAV system.

More specifically, FIG. 2A is a diagram 200A that shows a MAV player interface 210 configured, as described herein, to allow for simultaneous playback of multiple sources of video content (e.g., for playback of multiple angles) relating to a single experience or event. For example, MAV player interface 210 may, in some embodiments, include multiple video areas for simultaneously playing back synchronized video content from different angles at the same time, such that more than one video feed is played back at once.

MAV player interface 210 may include main video area 215, which may be a portion of the display for playing back video content from one angle in a window. MAV player interface 210 may further include one or more auxiliary video windows or auxiliary video display areas, such as available angle areas 211a-d. Main video area 215 and available angle areas 211a-d may be video playback regions configured for playback of video content, and MAV player interface 210 may be configured to play back the video content rendered in each area in a synchronized fashion, such that a user may switch between different angles to be displayed in main video area 215 with no latency or lag (e.g., less than 0.1 seconds, less than 0.05 seconds, or less than a refresh-rate time of a video) in switching between angles.

In some embodiments, the videos being synchronously played back in main video area 215 and one or more available angle 211a-d can correspond to a plurality of videos grouped by a grouping and synching server (e.g., grouping and synching server 120 of FIGS. 1A-B) as being related to the same viewing experience (e.g., a concert, performance, wedding, sporting event, speech, rally, demonstration, conflict, or other public or private event), as described above with respect to FIGS. 1A-B.

As shown in diagram 200A, there are four available angle areas 211a-d displayed. In some embodiments, the number of available angle areas may increase or decrease in accordance with the number of angles associated with the experience or event that a user is watching.

In some embodiments, MAV player interface 210 may include one or more other user-interface objects or areas for paginating available video angles, such as paginating the angles by time. In the example shown in FIG. 2A, multi-angle video player interface 210 includes an angle navigator interface 216 to enable the user interacting with multi-angle video player interface 210 to paginate by time all available videos angles that are part of the multi-angle video experience being reproduced. Further, as shown in FIG. 200A, angle navigator interface 216 may include arrows displayed to each side of the four available angle areas 211a-d. These arrows, which in some embodiments may be clickable or tappable, may cause the available angle areas to scroll, page, and/or translate side to side in order to bring additional or alternate available angle areas onto the display. Together, the available angle areas 211a-d and associated scrolling/paging/translating arrows may constitute (in whole or in part) angle navigator interface 216, which may be a portion of the overall MAV player interface 210.

As described above, MAV player interface 210 may be configured to play back the video content rendered in each area in a synchronized fashion. For example, when a user executes an input to cause content in main video area 215 to play back, the video content in available angle areas 211a-d may automatically be played as well; similarly, when a user executes commands causing the video content in main video area 215 to pause, stop, fast-forward, rewind, slow-forward, or slow-rewind, the command may similarly cause the video content in available angle areas 211a-d to be paused, stopped, fast-forwarded, rewound, slow-forwarded, or slow-rewound in a corresponding and synchronized manner.

In some embodiments, each displayed video area/window may have a dedicated set of video controls (e.g., play, pause, fast-forward, etc.), while in some embodiments fewer sets of video controls may be displayed than the number of windows. For example, only one set of video controls may be displayed, and the sole set may control playback of video content in all windows. In some embodiments, a single displayed set of video controls may be displayed adjacent to, on top of, or spaced apart from one or more of the video windows. In some embodiments, the location of a displayed set of video controls may be fixed, while in some embodiments the location of a displayed set of video controls may move in accordance with one or more of the video windows (e.g., main video area 215).

In some embodiments, main video area 215 may, in some embodiments, be larger than other video areas or available angle windows, such as available angles 211a-d. In some embodiments, main video area 215 may be more than twice as large, more than three times as large, more than five times as large, or more than ten times as large as other video areas. It may be advantageous for main video area 215 to be substantially larger than other video areas so that the majority of a user's focus may be drawn to main video area 215. However, it may be advantageous for main video area 215 to not be more than 10 times as large as other video areas (e.g., available angle 211a-d representing auxiliary video viewing areas), or not more than 15 times as large or more than 25 times as large, such that a non-negligible portion of the user's attention may remain on the other video areas of the synchronized video interface and experience.

In the example shown, main video area 215 and the available angle windows 211a-d are displayed on separate (e.g., non-overlapping) portions of the display; however, in some embodiments, the windows may overlap with one another. For example, the windows may in some embodiments be able to be moved, re-sized, and/or re-ordered (e.g., sent to the front or back) by a user. In some embodiments, main video area 215 may be a full-screen video area, and other features of MAV player interface 210, including one or more of the available angle windows 211a, may be displayed overlaid on main video area 215. In some embodiments, one or more of main video area 215 and/or available angle windows 211a-d may be semi-transparent.

MAV player interface 210 may further include a displayed icon, button, affordance, or other user-interface object for adding a new angle to the experience to which the videos displayed in main video area 215 and available angles 211a-d are directed. In some embodiments, MAV player interface 210 includes icon 212 for adding a new angle. In some embodiments, icon 212 may be clicked or tapped by a user, and this may cause the device rendering MAV player interface 210 to display a prompt or other interface configured to allow a user to upload or live-stream or otherwise provide video content (and associated metadata) to be added to an experience (e.g., to a group of videos about a related subject or event) that a user is watching.

For example, if a user is at a concert and it watching synchronized videos of the concert from other concertgoers through MAV player interface 210, then the user may tap icon 212 on the touch-screen display of the user's smart phone, and the user's device may automatically begin (or may prompt the user to begin or may otherwise enable to the user to being) live-streaming video from the user's device to a MAV system (e.g., MAV system 100A-B), such that the user's video may be viewed in synchronization with the other videos already included in the experience. In some embodiments, if an experience is depicting a live event (e.g., an event including one or more other live-streaming video angles), then clicking or tapping icon 212 to add a new angle may cause the device to live-stream video content from the user's device; on the other hand, in some embodiments, if an experience is depicting a non-live event (e.g., an event including one or more pre-recorded video angles that do not correspond to an ongoing, live-streaming event), the clicking or tapping icon 212 to add a new angle may cause the device to upload pre-recorded video. In some embodiments, the user may be able to confirm or override these presumptions.

In some embodiments, MAV player interface 210 and/or MAV system may be configured such that a user may only be permitted to add an angle to an experience if the MAV system determines that the user's video genuinely is associated with the experience. For example, for a non-live experience (e.g., a past concert), time metadata and location metadata of a video selected by a user for upload to the experience may be analyzed to ensure that the video genuinely corresponds to the past time and location of the non-live experience. Alternately, for a live-experience, a MAV system may use the current location of a user's device in order to determine the experiences for which a user may be eligible to contribute angles. In some embodiments, certain experiences may be locked/restricted based on time and/or location (and/or other criteria), while other experiences may not. For example, an experience associated reaction videos to a viral video may be open to contributors from any location at any time, whereas an experience associated with a music festival may be restricted in both location and time. An intermediate experience could be an experience associated with watch parties for a televised sporting event such as the World Cup or Super Bowl; this experience may be restricted in time (e.g., to the time of the game), but may be open to videos from any location.

MAV player interface 210 may further include one or more displayed icons, buttons, affordances, or other user-interface objects for controlling audio of one or more angles of the MAV experience. For example, as shown in diagram 200A, main video area 215 and each available angle area 211a-d each include a respective audio control icon in the shape of a speaker. In the depicted example, the speaker icon associated with available angle area 211b displays sound-waves indicating that the audio currently selected to be produced by MAV player interface 210 is associated with available angle area 211b. The other speaker icons in the displayed example contain no displayed sound waves (and instead display a small "X"), indicating that audio from those angles is not currently selected. In some embodiments, other indicators, such as varying the color, transparency, position size, strikethrough, or presence of one or more audio icons, may be used to indicate whether audio from a respective angle of an experience is or is not currently being played back.

In some embodiments, audio from more than one angle may be simultaneously played back, while in some embodiments, audio from only one angle may be played back. In some embodiments, MAV player interface 210 may default to playing back audio associated with the video content being played back in main video area 215. In some embodiments, a user may select which audio content should be played back in a similar manner in which a user may select which video content should be played in main video area 215.

For example, in some embodiments, a user may click or tap on video content in an available angle area 211 in order to cause that angle to be moved to main video area 215 and played back there; in some embodiments, this may also cause audio from the selected angle to be played back. In some embodiments, a user may manually select a different audio source, for example by clicking on an audio icon associated with a particular video window/area, or by tapping and holding on a touch screen at a location associated with a particular video window/area.

In some embodiments, a user may toggle between audio feeds from each angle one at a time; in some embodiments, a user may freely activate and deactivate audio from any one or more angle, including altering volume of the audio played back by individual angles. In some embodiments, respective volume sliders may be displayed that correspond to respective angles, while in some embodiments one master volume slider, mute control, and/or other audio control features may be displayed as a part of MAV player interface 210.

In some embodiments, users may select with a simple touch or click any of the videos contained in one of available angles 211a-d, and the selected video may responsively be displayed in main vide area 215 (with or without ceasing to display the video in one or more accessory windows). In addition, users may, in some embodiments, select (e.g., via touch or click on a video or displayed affordance associated with a respective audio source) and combine one or more different audio sources being reproduced either in main video area 215 or in one or more available angles 211a-d. For example, in order to select a particular audio source from a native mobile multi-angle player, a user may touch a window in which that audio is being reproduced, and may hold the touch for one second. In an alternate embodiment (e.g., in a web-browser interface optimized for use with a mouse rather than a touch-screen), a user may select an audio icon of a particular video for which the user wishes to select the audio source. When one audio source is on, all others may be instantly muted responsive to the one audio source being selected, according to some embodiments.

FIG. 2B is a diagram 200B that shows a MAV player interface configured to enable a user operating device 220 (e.g., web-browser capable device 140 or portable device 141) to navigate among a plurality of related active videos 221A-E in a virtual carousel to select specific video content for playback, according to some embodiments. In some embodiments, the MAV player interface shown in diagram 200B can be implemented within a client application (e.g., client application 100 of FIG. 1A) stored on device 220. In some embodiments, active videos 221A-E can represent a plurality of videos that a grouping and synching server (e.g., grouping and synching server 120 of FIG. 1A) has grouped together as being related videos and showing the same or similar experience, as described above with respect to FIGS. 1A-B.

In some embodiments, in contrast to MAV player interface 210 of FIG. 2A, the MAV player interface of FIG. 2B can be configured to show an actively displayed video in a primary window without displaying other related video content in auxiliary windows. For example, diagram 200B shows active and displayed video 221C being played on a display of device 220; further, active and displayed video 221C may expand to the size of the primary window (e.g., a full screen video or a full window of the MAV interface).

In some embodiments, the other videos related to active and displayed video 221C can be actively playing, but hidden, in the background. In particular, in the MAV player interface of FIG. 2B, the active and hidden videos 221A, 221B, 221D, and 221E may be configured in a virtual carousel that allows the user operating device 220 to horizontally swipe (or tap a portion of the screen of device 220) to switch between various active videos. For example, by swiping left on the screen of device 220, active and displayed video 221C may be rotated out of view and active and hidden video 221B may slide into view onto the display of device 220 and become the new active and displayed video.

In some embodiments, because the virtual carousel includes videos that are active and played synchronously (e.g., synchronized for play back by grouping and synching server 120), a swiping (or tapping) interaction within the MAV player interface provides a smooth, synchronized transition between videos. In some embodiments, the number of active videos 221A-E in the virtual carousel may vary depending on the broadband connectivity (e.g., in megabytes per second). In some embodiments, the MAV player interface may be configured to determine a portion of videos in the virtual carousel to be actively playing (either displayed or hidden) based on the broadband connectivity of device 220, the user's video consumption behavior including scroll time, speed, or other gestures. For example, the MAV player interface may be configured to determine videos within a threshold number of swipes (e.g., two left and/or right swipes) to be active. In some embodiments, the MAV player interface may be configured to determine videos within a first threshold number of left swipes and a second threshold number of right swipes to be active. For example, as shown in diagram 200A, videos (e.g., active videos 221A-B and 221D-E) within two left or right swipes of active and displayed video 221C may be active.

In some embodiments, one or more audio sources associated with videos 221A-E may be playing simultaneously. In some embodiments, the user can select one or more of the audio sources corresponding to active videos 221A-E to be playing based on a speaker icon, as described with respect to FIG. 1A. For example, the user can switch audio sources by clicking on the speaker icon or holding a tap (e.g., a long tap). In some embodiments, upon activating an audio sources of an active video (e.g., audio associated with active video 221B), all other audio sources of related videos may be muted.

FIG. 2C is a diagram 200C that shows a MAV player interface configured to enable a user operating device 240 (e.g., web-browser capable device 140 or portable device 141) to navigate among a plurality of related active videos 229-233 to select specific video content for playback, according to some embodiments. In some embodiments, further to the horizontal virtual carousel mechanism as described with reference to FIG. 2B, the MAV player interface shown in diagram 200C enables the user to navigate between videos via a horizontal virtual carousel and a vertical virtual carousel. Similar to the virtual carousel mechanism described above with respect to active videos 221A-E, the MAV player interface of FIG. 3B enables the user to swipe between related active videos 231A-E in a horizontal virtual carousel. As shown in diagram 200C, device 240 displays active and displayed video 231C in a primary window with the other active videos 231A-B and 231D-E being hidden (e.g., playing in the background and not on the display of device 240).

In some embodiments, the MAV player interface of FIG. 2C also implements a vertical virtual carousel mechanism to enable the user to smoothly—and without interrupting the viewing experience—discover videos 229, 230, 232, 233 (collectively referred to as 'other videos') related to active and displayed video 231C. In some embodiments, these other videos may grouped by a grouping and synching server (e.g., grouping and synching server 120 of FIG. 1A) as being in a related list, timeline, or collection. Much like the navigation mechanism for the horizontal virtual carousel of FIG. 2B, the vertical virtual carousel can be navigated by the user through vertical swipes up or down to access the next video 230 or 232, respectively, in the vertical virtual carousel. In some embodiments, similar to the active/hidden mechanism as described with respect to FIG. 2B, one or more of the other videos hidden from view may be actively playing in the background. In some embodiments, the MAV player interface of FIG. 3B can be configured to determine which videos are active (both in the vertical and horizontal virtual carousels) based on a broadband connectivity (e.g., megabytes per second), a memory storage, a user's video consumption behavior (e.g., scroll time, speed, average time spent viewing a video, other gestures, etc.), or a combination thereof.

In some embodiments, when videos are switched vertically, audios corresponding to the videos are also switched together with the video. In some embodiments, the MAV player interface is configured to transition the audio and the video proportionally. For example, when a user swipes up, active and displayed video 231C will be slide out to become a hidden video and active and hidden video 232 will slide onto the display of device 240 to become the new active and displayed video. In this example, because audio and video are played proportionally during a video/audio transition, the audio and video of both active videos 231C and 232 are played at the same time, but not in equal volumes or in equal amounts. In other words, the volume played for each video that is being swiped in or out, is proportional to the amount of screen space being used by each video. Therefore, as more of active video 232 is being slid into the display area of device 240, the proportion of the volume of the audio of active video 232 compared to the volume of the audio of active video 231C (being slid out) increases.

Syncing Live Videos

Figure 3A:
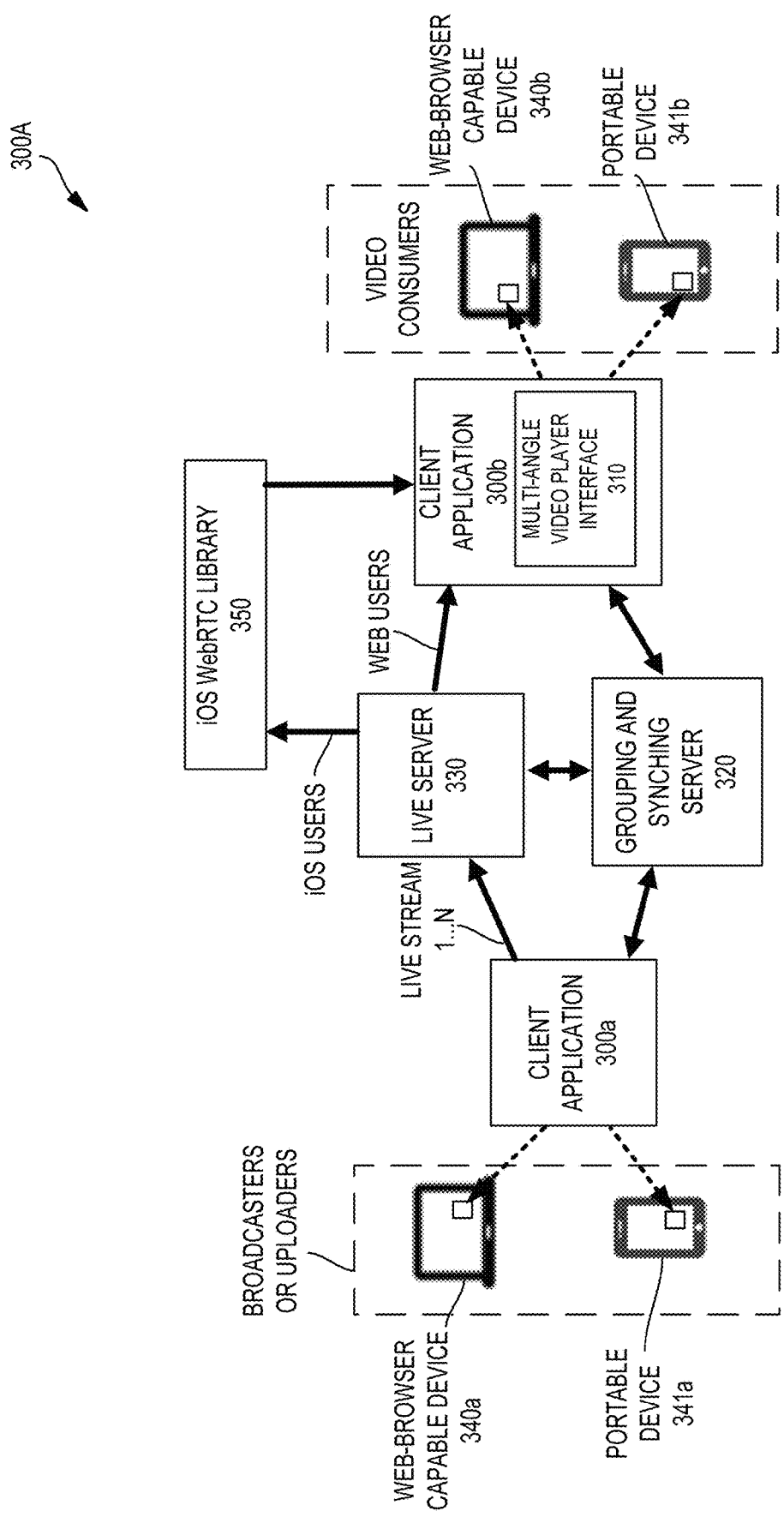
FIGS. 3A-B show MAV systems for uploading and streaming videos in accordance with some embodiments.

FIG. 3A shows a MAV system 300A for uploading and syncing videos in accordance with some embodiments. As described herein, MAV system 300A may enable users to upload and sync videos such that the videos may be available for consumption as part of a MAV interface. Video data, which may include and/or accompany associated audio data and associated metadata, may be uploaded through MAV system 100A, as described with respect to FIG. 1, and the uploaded data may be processed in order to configure the video data to be viewed in a MAV interface in synchronization with other videos in MAV system 300A or other videos provided from different sources. In some embodiments, MAV system 300A may facilitate syncing both live videos as well as non-live videos.

The MAV system 300A includes broadcasters or uploaders, who may be any party in communication with other elements of MAV system 300A who provide video data in MAV system 300A. Broadcasters/uploaders may include users of web-browser capable device 340*a* and/or users of portable device 341*a*. Web-browser capable device 340*a* and portable device 341*a* may correspond to web-browser capable device 140 and portable device 141, respectively, as described above with reference to FIG. 1.

The MAV system 300A includes video consumers, who may be any party in communication with MAV system 300A who receive video data in MAV system 300A. Video consumers may include users of web-browser capable device 340*b* and/or users of portable device 341*b*. Web-browser capable device 340*b* and portable device 341*b* may correspond to web-browser capable device 140 and portable device 141, respectively, as described above with reference to FIG. 1. In some embodiments, a video consumer may be the same party as a broadcaster/uploader.

The MAV system 300A further includes client application 300*a* and 300*b*, which may represent distinct instances of the same client application 300, according to some embodiments. As shown by the dotted arrows, client application 300*a-b* may be an application stored on device 340*a*, 340*b*, 341*a*, or 341*b* (or on any other device associated with a video consumer or broadcaster/uploader) and configured to interface with other components of MAV system 300A. Client application 300 may correspond to client application 100, as described above with reference to FIG. 1. As shown in FIG. 3A, client application 300*b* may contain instructions for rendering MAV player interface 310, which may correspond to MAV interface players 200A-C, as described above with reference to FIG. 2.

The MAV system 300A further includes live server 330, which may be any server configured to receive live-stream video data (and associated audio data and/or associated metadata) from client application 300*a* of broadcasters/uploaders. In some embodiments, live server 300 may in fact be multiple servers and/or multiple server instances, and may for example be automatically scaled up or down to meet processing and bandwidth demands depending on the needs of MAV system 300A (this principle may also be applicable to other servers discussed herein). In some embodiments, liver server 300 may be further configured to distribute live-stream video data (and associated audio data and/or associated metadata) to devices (e.g., web-browser capable device 340*b* or portable device 341*b*) associated with video consumers. As shown in FIG. 3A, live server 330 may be configured to simultaneously receive multiple live streams, for example by receiving data corresponding to N different live streams from N different users simultaneously. In some embodiments, live server 330 may receive a plurality of live streams from a plurality of corresponding broadcasters or uploaders via a plurality of respective client application 300*a* (e.g., each device of broadcasters or uploaders may implement an instance of client application 300*a-b*). In some embodiments, live server 300 may distribute live-stream video data directly to devices associated with video consumers, as shown for example by the arrow labeled "web users;" while in some embodiments, live server 300 may distribute video data indirectly (e.g., through one or more intermediary services, parties, or servers) to devices associated with video consumers, as shown for example by the arrow labeled iOS users. In some embodiments, a web user can be a video consumer operating a device (e.g., web-browser capable device 340*b* or portable device 341*b*) including a network interface (e.g., a wired or wireless interface) configured to access the internet to access remote resources through network protocols such as via the World Wide Web among other types of protocols (e.g., FTP, instant messaging, etc.).

In some embodiments, if a user decides to go live (e.g., decides to begin producing and uploading live video content), live server 330 may store an indication of one or more items of metadata associated with the live video content being provided, including storing the time that the user began uploading video content, hashtag string data, caption description text data, other time data, location data, position data, and/or images data, all which may be saved by grouping and syncing server 320. MAV system 300A (e.g., grouping and syncing server 320) may processes the video along with its data to search for one or more other videos that share one or more metadata elements (e.g., time data and/or hashtag data) that is similar or the same.

The MAV system 300A further includes iOS WebRTC library 350, which may be a library containing one or more library files allowing live server 330 to serve live-stream video to iOS users in real-time. In some embodiments, iOS WebRTC library 350 can include libraries to serve iOS users as well as users using devices running other operating systems such as Android, Windows, etc.

The MAV system 300A further includes grouping and syncing server 320, which may be in communication with live server 330, with client applications 300a-b, and/or with other components of MAV system 300A. Grouping and syncing server 320 may, in some embodiments, send and/or receive metadata directly from client application 300a or 300b, and/or it may send and/or receive metadata from live server 330. In some embodiments, grouping and syncing server 320 corresponds to grouping and syncing server 120, as described with respect to FIGS. 1A-B, and performs similar functionality. For example, like grouping and synching server 120, grouping and syncing server 320 may be configured to filter/group/associate live-stream videos with one another based on one or more common characteristics to group videos together into MAV experiences. When processing live-stream data for grouping, time-based metadata may not be considered in the same manner as described above with reference to FIG. 1A; rather, live-stream videos may simply be eligible for grouping together with other simultaneous live-stream videos. In some embodiments, live-stream videos may be synchronized with one another for simultaneous playback via MAV player interface 310, which may include calculating one or more time corrections or time offsets to be applied to the live-stream data (e.g., in conjunction with an NTP server as discussed above with reference to FIG. 1) to facilitate precise syncing of multiple live-stream videos.

When a broadcaster/uploader executes an input at an associated device (e.g., devices 340a or 341a) indicating that the user wishes to start a live stream, a process for starting a live stream may leverage client application 300a to connect to a web server (such as live server 330 and/or iOS WebRTC server 350) in order to create a new specified live streaming instance that may enable live transmission of video data, audio data, and metadata that may include, for example, time, geolocation, image captures, and video description data that may include hashtag strings or text/caption data. Other types of metadata are described above with reference to FIG. 1A. In some embodiments, the video data, audio data, and metadata may be stored by grouping and syncing server 320. Live server 330 and/or iOS WebRTC server 350 may return a live video connection to client 300b with less than one second of latency (or less than 0.5 seconds of latency, or less than 0.1 seconds of latency), and may enable other users to join in a multi-angle live stream by associating new (e.g., additional) live streams that match or approximate the metadata of existing streams. Matching similar metadata that may be used to associate one or more live streams and to associate the streams together into a synced multi-angle live stream may include, in some embodiments: hashtag strings (e.g., text and/or numeral strings following a # symbol), caption description text, time, location, position, and/or image data.

Because a plurality of users of MAV system 300A may be able to live stream with latency times below one second, live video synchronization may accordingly be attained by MAV system 300A, and synchronized live video content including video content from multiple live-streamed video sources may then be delivered to one or more clients (e.g., client application 300b) and/or users via a MAV player interface (e.g., MAV player interface 310), such as the interface described above with reference to FIG. 2.

In some embodiments, after a live stream is performed (for example as described herein in association with FIG. 3), a user may decide to save a copy of one or more elements of the video data to MAV system 300A as described herein. If so, the metadata information associated with the video data (e.g., with the ended live stream) may be stored by grouping and syncing server 320 together with a copy of the recording (e.g., a copy of the video and audio data itself), which may be transcoded into different formats. In some embodiments, live-stream video data may be temporarily automatically saved by live server 330 and/or grouping and syncing server 320 such that MAV system may be capable of permanently or durably storing video data and/or metadata associated with the live stream after the live stream has ended.

Figure 3B:
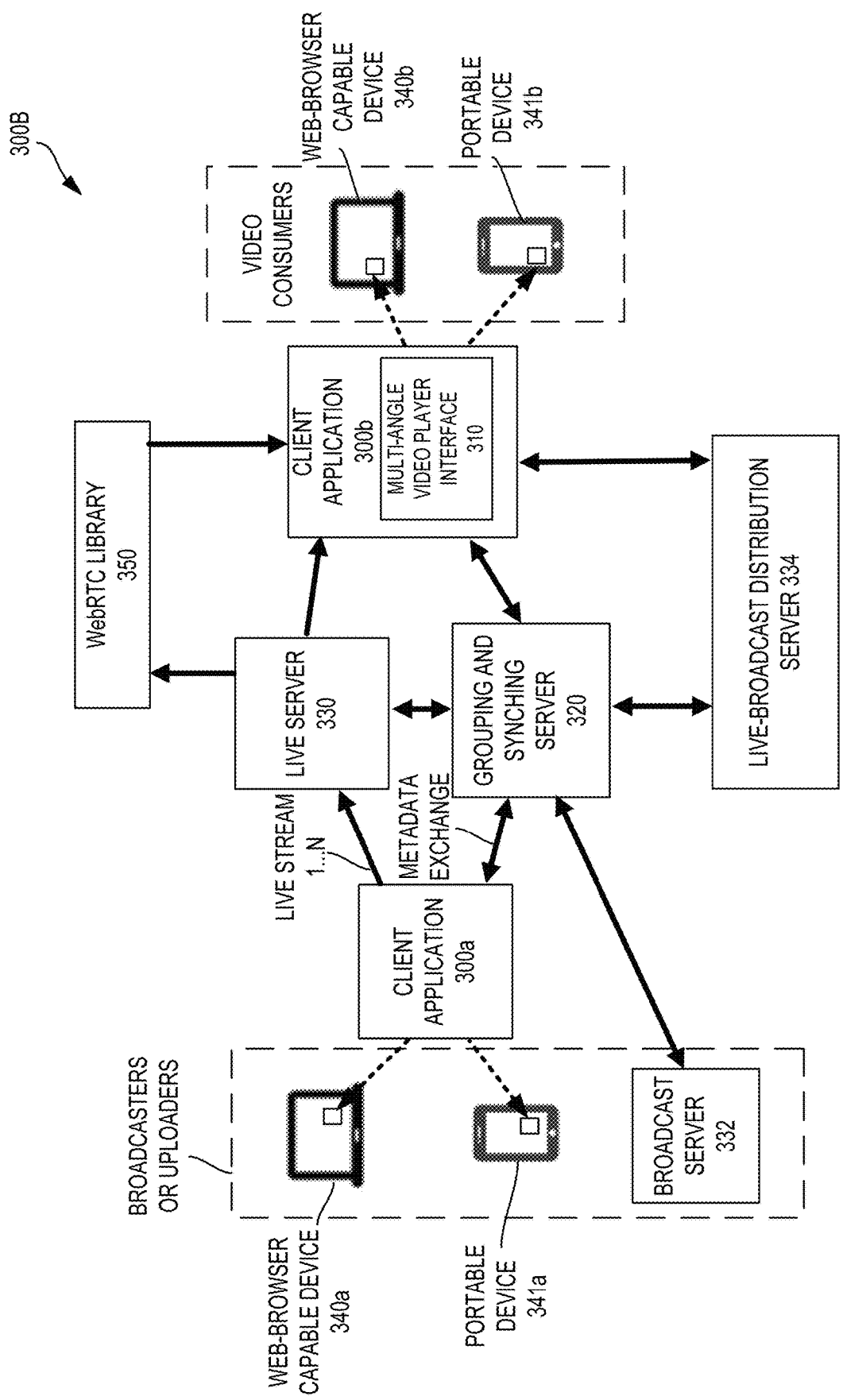

FIG. 3B shows a MAV system 300B for uploading and syncing videos in accordance with some embodiments. Further to MAV system 300A of FIG. 3A and as shown in FIG. 3B, broadcasters or uploaders may include users or entities (e.g., a TV network, a news organization, etc.) operating one or more broadcast server 332. For example, broadcast server 332 can be configured to broadcast a live video feed as captured by a video source (e.g., a video camera). In some embodiments, in addition to receiving live streams from client application 300a, grouping and synching server 320 can be configured to receive a live stream (e.g., video including video data and/or associated metadata) from broadcast server 332. In some embodiments, broadcast server 332 may also implement an instance of client application 300a and communicate with grouping and synching server 320 via client application 300a, as described above with respect to FIG. 3A.

In some embodiments, MAV system 300B further includes live-broadcast distribution server 334 configured to process and distribute to client application 300b one or more livestreams received at grouping and synching server 320. In some embodiments, these livestreams include: one or more livestreams from live server 330, one or more livestreams from broadcast server 332, or a combination thereof. In some embodiments, rather than have grouping and synching server 320 transmit video (e.g., video data and/or associated content, or a livestream) to client application 300b, live-broadcast distribution server 334 can be configured to forward to client application 300b the output (e.g., video) of grouping and synching server 320.

In some embodiments, live-broadcast distribution server 334 can be configured to distribute live video (e.g., a livestream) to client application 300b based on one or more of the following video streaming protocols: HLS, MPEG-Dash, RTMP, or RSTP, In some embodiments, live-broadcast distribution server 334 can communicate with client application 300b to determine a video streaming protocol compatible with client application 300b.

In some embodiments, by implementing one or more of the above video streaming protocols, live-broadcast distribution server 334 can be configured to scale to serve a large number of live video consumers (e.g., devices 340*b* or 341*b* with client application 300*b*) without stressing the webRTC connection between live server 330 and client application 300*b*, as described above with respect to FIG. 3A.

Figure 4:
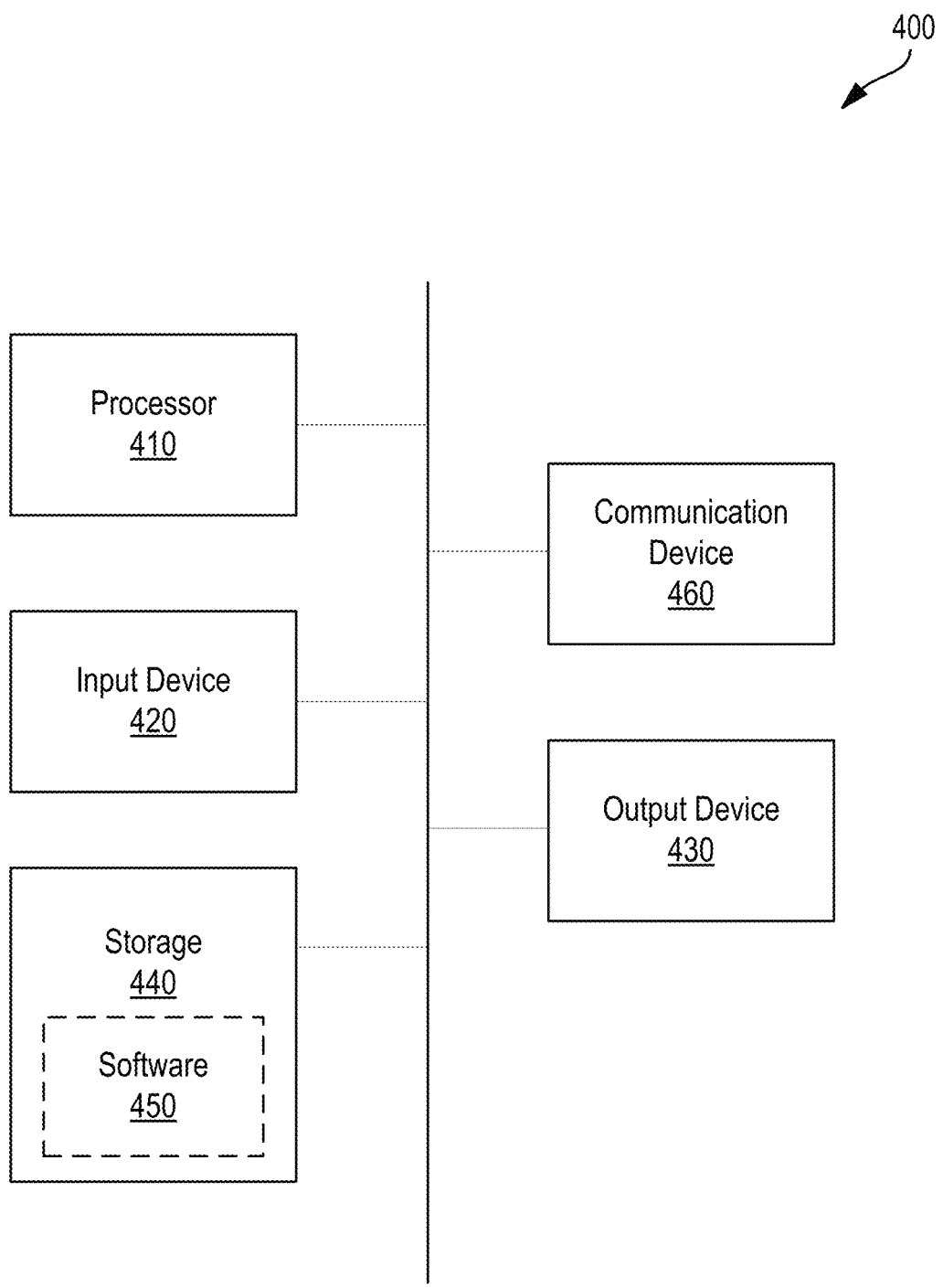
FIG. 4 shows an example of a computing device in accordance with some embodiments.

FIG. 4 illustrates an example of a computer in accordance with one embodiment. Computer 400 can be a host computer connected to a network. Computer 400 can be a client computer or a server. As shown in FIG. 4, computer 400 can be any suitable type of microprocessor-based device, such as a personal computer, workstation, server or handheld computing device such as a phone or tablet. The computer can include, for example, one or more of processor 410, input device 420, output device 430, storage 440, and communication device 460. Input device 420 and output device 430 can generally correspond to those described above, and can either be connectable or integrated with the computer.

Input device 420 can be any suitable device that provides input, such as a touch screen or monitor, keyboard, mouse, or voice-recognition device. Output device 430 can be any suitable device that provides output, such as a touch screen, monitor, printer, disk drive, or speaker.

Storage 440 can be any suitable device the provides storage, such as an electrical, magnetic or optical memory including a RAM, cache, hard drive, CD-ROM drive, tape drive or removable storage disk. Communication device 460 can include any suitable device capable of transmitting and receiving signals over a network, such as a network interface chip or card. The components of the computer can be connected in any suitable manner, such as via a physical bus or wirelessly.

Software 450, which can be stored in storage 440 and executed by processor 410, can include, for example, the programming that embodies the functionality of the present disclosure (e.g., as embodied in the computers, servers and devices as described above). In some embodiments, software 450 can include a combination of servers such as application servers and database servers.

Software 450 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Computer 400 may be connected to a network, which can be any suitable type of interconnected communication system. The network can implement any suitable communications protocol and can be secured by any suitable security protocol. The network can include network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A device for providing synchronized video content, the device comprising a display, one or more processors, and memory storing one or more programs executable by the one or more processors, the one or more programs comprising instructions for:
   receiving a request from a user to play first video data; and
   in response to receiving the first request from the user:
      playing the first video data;
      storing second video data and a plurality of video data related to the first video data; and
      simultaneously with playing the first video data, playing the second video data, wherein playback of the first video data is synchronized with playback of the second video data, and wherein the plurality of video data related to the first video data is hidden from view and actively played in the background.

2. The device of claim 1, wherein the second video data is automatically selected for simultaneous playback alongside the first video data in accordance with a determination that one or more criteria of the first video data matches corresponding criteria of the second video data.

3. The device of claim 2, wherein the one or more criteria of the first video data comprise a time at which the first video data was recorded.

4. The device of claim 2, wherein the one or more criteria of the first video data comprise a location at which the first video data was recorded.

5. The device of claim 1, wherein playing the second video data simultaneously with playing the first video data comprises:
   playing the first video data in a primary window displayed on the display;
   playing the second video data in an auxiliary window displayed on the display;

receiving an input from the user indicating a selection of the second video; and in response to receiving the input from the user:

ceasing to play the first video data in the primary window, and continuing playback of the first video data in the auxiliary window; and ceasing to play the second video data in the auxiliary window, and continuing playback of the second video data in the primary window.

6. The device of claim 1, wherein synchronizing the first video data with the second video data comprises playing the first video data and second video data such that a common event depicted in both the first video data and the second video data is played back at the same time.

7. The device of claim 1, wherein synchronizing the first video data with the second video data comprises playing the first video data and second video data such that a similar characteristic depicted in both the first video data and the second video data is played back at the same time.

8. The device of claim 1, wherein the first video data is a livestream, and wherein the one or more programs comprise instructions for receiving the livestream based on at least one of WebRTC, RTMP, RSTP, or HLS.

9. The device of claim 1, wherein the one or more programs comprise instructions for synchronizing playback of the first video data with the second video data based on comparing one or more of: audio signatures of the first and second video data, image patterns of the first and second video data, or text of the first and second video data.

10. A method for providing synchronized video content, the method performed at a device having a display, one or more processors, and one or more processors, the method comprising:

receiving a request from a user to play first video data; and in response to receiving the first request from the user:

playing the first video data;

storing second video data and a plurality of video data related to the first video data; and simultaneously with playing the first video data, playing the second video data, wherein playback of the first video data is synchronized with playback of the second video data, and wherein the plurality of video data related to the first video data is hidden from view and actively played in the background.

11. The method of claim 10, comprising:

automatically selecting the second video data for simultaneous playback alongside the first video data in accordance with a determination that one or more criteria of the first video data matches corresponding criteria of the second video data.

12. The method of claim 11, wherein the one or more criteria of the first video data comprise a time at which the first video data was recorded.

13. The method of claim 11, wherein the one or more criteria of the first video data comprise a location at which the first video data was recorded.

14. The method of claim 10, wherein to play the second video data simultaneously with playing the first video data, the method comprises:

playing the first video data in a primary window displayed on the display;

playing the second video data in an auxiliary window displayed on the display;

receiving an input from the user indicating a selection of the second video; and in response to receiving the input from the user:

ceasing to play the first video data in the primary window, and continuing playback of the first video data in the auxiliary window; and ceasing to play the second video data in the auxiliary window, and continuing playback of the second video data in the primary window.

15. The method of claim 10, comprising:

synchronizing the playback of the first video data with the second video data by playing the first video data and the second video data such that a common event depicted in both the first video data and the second video data is played back at the same time.

16. The method of claim 10, comprising:

synchronizing the playback of the first video data with the second video data by playing the first video data and the second video data such that a similar characteristic depicted in both the first video data and the second video data is played back at the same time.

17. The method of claim 10, wherein the first video data is a livestream, and wherein the method comprises:

receiving the livestream based on at least one of WebRTC, RTMP, RSTP, or HLS.

18. The method of claim 10, comprising:

synchronizing the playback of the first video data with the second video data based on comparing one or more of: audio signatures of the first and second video data, image patterns of the first and second video data, or text of the first and second video data.

19. A device for providing synchronized video content, the device comprising a display, one or more processors, and memory storing one or more programs executable by the one or more processors, the one or more programs comprising instructions for:

receiving a first request from a user to play first video data;

in response to receiving the first request from the user:

playing the first video data in the display, and storing the first video data and a plurality of video data associated with the first video data in a virtual carousel configured to enable the user to select second video data of the plurality of video data for playing in the display, wherein the second video data is adjacent to the first video data in the virtual carousel, and wherein the plurality of video data are hidden from view and actively played in the background.

20. The device of claim 19, wherein the virtual carousel is a first virtual carousel and the plurality of video data is a first plurality of video data, and wherein in response to receiving the first request from the user, the one or more programs comprising instructions for:

storing the first video data and a second plurality of video data associated with the first video data in a second virtual carousel configured to enable the user to select third video data of the second plurality of video data for playing in the display, wherein the third video data is adjacent to the first video data in the second virtual carousel.

21. The device of claim 20, wherein the one or more programs comprise instructions for:
- receiving an input from the user indicating a selection of video data related to the first video data playing in the display;
- in response to receiving the input from the user:
  - sliding the first video data out of the display; and
  - simultaneously with sliding the first video data, sliding video data from one of the first plurality of video data or the second plurality of video data onto the display based on a type of the user input.

22. The device of claim 19 wherein audio associated with the first video data is played and audio associated with the plurality of video data is muted.

23. The device of claim 19, wherein the one or more programs comprise instructions for:
- receiving an input from the user indicating a selection of the second video data; and
- in response to receiving the input from the user:
  - sliding the first video data out of the display; and
  - simultaneously with sliding the first video data, sliding the second video data onto the display.

24. The device of claim 23, wherein the input comprises a horizontal swipe or a vertical swipe on the display.

25. The device of claim 19, wherein the plurality of video data are automatically selected for storing in the virtual carousel in accordance with a determination that one or more criteria of the first video data matches corresponding criteria of each video data in the plurality of video data.

26. The device of claim 19, wherein the plurality of video data actively played in the background is played synchronously with playing the first video data in the display.

* * * * *